United States Patent
Alexanian et al.

(10) Patent No.: US 6,335,855 B1
(45) Date of Patent: Jan. 1, 2002

(54) BATTERY POWERED PROGRAMMABLE REMOTE SWITCH CONTROLLER

(76) Inventors: George Alexanian; Eugene S. Carlson, both of 4761 W. Jacquelyn Ave., Fresno, CA (US) 93722

(*) Notice: Subject to any disclaimer, the term of this patent is extended or adjusted under 35 U.S.C. 154(b) by 0 days.

(21) Appl. No.: 09/697,336

(22) Filed: Oct. 25, 2000

Related U.S. Application Data

(63) Continuation-in-part of application No. 09/315,375, filed on May 18, 1999, which is a continuation-in-part of application No. 09/063,871, filed on Apr. 10, 1998, now Pat. No. 5,914,487.

(51) Int. Cl.$^7$ .............................................. H01H 47/12

(52) U.S. Cl. ..................... 361/179; 361/170; 307/139

(58) Field of Search ................................. 361/152, 156, 361/170, 160, 179, 143, 147; 307/66, 139, 140, 141.4; 320/125, 136, 155; 355/153–170; 340/310.01; 455/3.2, 3.3; 700/9

(56) References Cited

U.S. PATENT DOCUMENTS

| | | | |
|---|---|---|---|
| 3,825,153 A | | 7/1974 | Patrick |
| 3,921,052 A | | 11/1975 | Milano |
| 4,171,539 A | | 10/1979 | Tawfik |
| 4,203,153 A | | 5/1980 | Boyd |
| 4,279,020 A | | 7/1981 | Christian et al. |
| 4,423,484 A | | 12/1983 | Hamilton |
| 4,645,882 A | | 2/1987 | Nakayama et al. |
| 4,679,766 A | | 7/1987 | Cumming |
| 4,697,221 A | | 9/1987 | Pasquarella |
| 4,707,679 A | * | 11/1987 | Kennon et al. ........ 340/310.01 |
| 4,716,490 A | | 12/1987 | Alexanian |
| 4,718,454 A | | 1/1988 | Appleby |
| 5,105,329 A | | 4/1992 | Goldner |

(List continued on next page.)

OTHER PUBLICATIONS

Dayni Controls Automatic Sprinkler Systems brochure: Professional Series Digital Irrigation Controller.
Dayni Controls Automatic Sprinkler Systems brochure: Specifications/Controllers/Battery Solenoids.
Dayni Controls Automatic Sprinkler Systems brochure: Typical Irrigation Valve Installation.
DIG Irrigation Products 500 Series brochure (1997).
Rain Bird 1999–2000 Catalog, pp. 113–114(Three–Program battery–operated Controller).
Nelson 2000 Catalog, pp. 8–14 (8070 Series Controllers; 8010 8030 Series Controllers; 8050 series controllers).

Primary Examiner—Kim Huynh
(74) Attorney, Agent, or Firm—Mark D. Miller

(57) ABSTRACT

A battery powered radio programmable remote switch controller and a separate hand held programming unit (programmer) designed to conserve the life of the life of the controller batteries using a combination of low voltage circuitry in the controller and a magnetic switch in the controller that is triggered by the programmer. When brought into proximity with the controller, a magnet in the programmer activates a magnetic switch in the controller which energizes a radio receiver in the controller to receive programming transmitted by the programmer. After downloading the program, removal of the programmer from the proximity of the controller deactivates the magnetic switch turning off the radio receiver, thereby saving over 99% of the power otherwise required to continuously monitor for a radio signal. Controller power is further conserved by holding its remote switch energizing capacitor(s) in an uncharged state until just prior to activation, saving the energy lost by capacitive leakage and by using separate low and high voltage batteries to power the electronics and the remote switches respectively. Magnetic activation also allows for manual operation of the remote switch(es) by the use of a simple magnet to signal the controller to initiate a default operation, such as brief serial operation of each switch. Programming and manual activation can thereby be accomplished by means of a radio control without sacrificing battery power.

17 Claims, 6 Drawing Sheets

U.S. PATENT DOCUMENTS

| | | |
|---|---|---|
| 5,229,649 A | 7/1993 | Nielsen et al. |
| 5,251,325 A | 10/1993 | Davis |
| 5,311,068 A * | 5/1994 | Miller ........................ 307/112 |
| 5,347,421 A | 9/1994 | Alexanian |
| 5,402,303 A | 3/1995 | Luck et al. |
| 5,498,951 A | 3/1996 | Okamura |
| 5,562,713 A * | 10/1996 | Silvian ........................ 607/32 |
| 5,566,081 A | 10/1996 | Yoshizawa |
| 5,572,108 A | 11/1996 | Windes |
| 5,815,365 A | 9/1998 | Stege |
| 5,925,128 A * | 7/1999 | Harmon ...................... 713/200 |
| 5,983,071 A * | 11/1999 | Gagnon et al. .............. 455/3.2 |
| 6,162,238 A * | 12/2000 | Kaplan et al. .............. 606/201 |
| 6,181,324 B1 * | 1/2001 | Lamb et al. ................. 345/156 |
| 6,186,145 B1 * | 2/2001 | Brown ....................... 128/897 |

* cited by examiner

BATTERY POWERED PROGRAMMABLE REMOTE SWITCH CONTROLLER

This is a continuation in part of copending application Ser. No. 09/315,375 filed on May 18, 1999, which claims the benefit of U.S. application Ser. No. 09/063,871 filed Apr. 20, 1998, now U.S. Pat. No. 5,914,847.

1. BACKGROUND OF THE INVENTION

The present invention relates to remote switch controllers, and more particularly to an improved battery powered programmable remote switch controller having extended battery life that is adaptable for use in controlling irrigation valves.

2. FIELD OF THE INVENTION

Programmable irrigation valve controllers are well known in the art. Such controllers are used to open and close irrigation valves by providing electric current to solenoids located in close proximity to the valves. Relatively large electric currents are required to activate and deactivate such solenoids. Providing this required electricity is a simple matter if an external power source is readily available, such as a power line. However, many controllers must be located at remote field locations where it is impossible or impractical to run a power line or otherwise provide an external power source. Accordingly, programmable battery powered irrigation controllers have been developed.

The most significant limitation of existing battery powered irrigation controllers is battery life. Two voltage levels are generally required by such controllers: a low voltage level (which can be supplied by batteries, e.g. 3.5 volts) to operate the programming circuitry, and a higher voltage level (which can be supplied by a second set of batteries, e.g. 9 volts) to provide the necessary electrical impulses to operate the valve solenoids. The batteries on most existing battery powered controllers must be changed every few months, making them inconvenient to maintain and potentially unreliable to depend on for controlling irrigation cycles. At least one controller has addressed the problem of conserving the low voltage batteries used to operate the computing circuitry. In U.S. Pat. No. 4,423,484 to Hamilton, the microcomputer is turned off between cycles thereby conserving the low voltage batteries. However, the Hamilton controller does not address conservation of the higher voltage batteries used to operate the solenoids.

It is typical for a battery powered irrigation controller to use charging capacitors to operate the valve latching solenoids. These are generally large capacitors of 1000 micro farads or more. Most controllers (including Hamilton) maintain these capacitors in a charged condition, ready for immediate discharge to the solenoid upon receipt of a signal from the microprocessor (see e.g. U.S. Pat. No. 4,718,454 to Appleby). In addition, in most controllers these capacitors have an uninterrupted connection back to the high voltage (e.g. 9, 12 or 18 volts) batteries from which they are charged. Both of these situations reduce the life of the high voltage batteries, and give rise to other potential problems with the controller.

It is known that all charged capacitors leak over time. This places a constant drain on the high voltage batteries to which they are connected. Such leakage significantly increases with temperature increases. Thus, a fully charged capacitor in a controller located in the middle of an unshaded field during the hot summer months can rapidly deplete the high voltage batteries, even when not in use. The larger the capacitor, the larger the leakage current. Also the higher the ambient temperature, the higher the leakage. This leakage is very significant and could be as much as hundreds of microamps. The leakage causes the capacitor to draw on the battery power supply in order to stay fully charged, thereby wasting energy and leading to the frequent need to change batteries without even any solenoid operation. Preventing this leakage would conserve the life of the high voltage batteries.

Battery operated controllers such as Hamilton use the high voltage batteries for operating both the solenoids and the electronics. Since most low power circuits operate from 3 to 5 volts DC, the high voltage batteries must be reduced and regulated, thereby wasting a considerable amount of energy. Alternatively, a low voltage battery may use a boost converter (voltage multiplier) to step up the voltage as in U.S. Pat. No. 5,572,108 to Windes.

In all controllers, the large capacitors are fully discharged in order to operate the valve solenoids. The capacitors are then recharged from the high voltage batteries. At the instant the discharge occurs, current may also be drawn directly from the high voltage batteries themselves, resulting in unnecessary depletion of the high voltage batteries.

Changing the programming for remotely placed valve controllers also poses an ever present problem. With the change of seasons come changes in the amount irrigation water needed. The additional water required during hot summer months translates to longer open times for irrigation valves. Conversely, the reduced demand for water during the winter season translates to shorter or no open times for such valves. Changes in weather and weather patterns may also affect irrigation valve run times. Also different crops have different water requirements.

In order to address the ever present need to change irrigation valve run times, some remote irrigation valve controllers include a radio receiver which remains operational at all times. In this way, a signal can be transmitted to the receiver at any time and used to change the programming (run times) of the irrigation valves. However, maintaining a radio receiver in the "on" position over long periods of time requires considerable power, and will rapidly deplete the batteries of a remotely located controller. Frequently changing the batteries requires gaining access to the controller in the field which can be messy (especially in a cold, dark and/or damp environment), and may introduce unwanted foreign or corrosive materials to the delicate circuitry inside. In addition, the receiver may pick up an errant signal resulting in improper programming. Finally, unless the controller also includes a transmitter (another drain on the batteries), there is no way to confirm the receipt of programming instructions sent via radio.

The programming of other controllers may be changed by directly accessing the controller in the field. This is typically accomplished by opening the receptacle in which the controller is located and plugging a line into the controller to download new programming. As with a battery change, accessing the controller in this way may also introduce dust, dirt, debris or other undesirable material to the delicate internal circuitry of the controller. It is therefore desirable to avoid direct physical access to the remotely located controller in the field.

The need for battery powered programmable remote control switching systems is not limited to irrigation valves. Numerous industrial, utility and commercial applications also involve remote switches which must be reliably turned on and off at scheduled times in order to initiate or terminate processes, open or close gates, etc.

SUMMARY OF THE INVENTION

The present invention overcomes the disadvantages of prior art remote switching systems by providing a battery powered controller that conserves the life of the battery(ies) which operates the internal controller circuitry as well as the external switches (e.g. latching valve solenoids), and which may be easily programmed without direct physical access to the controller that might otherwise expose the internal circuitry to unwanted foreign material.

In the preferred embodiment, two sets of batteries are used in the present invention. A first set of one or more low voltage batteries (typically 3.0 to 3.6 volts) is dedicated to the internal circuitry (e.g. microprocessor). This low voltage powers the microprocessor directly without the need for regulation which would otherwise waste energy.

A second set of one or more high voltage batteries is provided which is only used for charging the capacitors which discharge into the remote switches (e.g. to operate the solenoids). This obviates any need to reduce or regulate this battery source for use by the electronic circuitry, so this potential energy loss is avoided.

In the present invention, the large capacitors are not charged until just a few seconds before the solenoid is to be energized. At that point, the microprocessor enables a transistor to turn on and charge such a capacitor. After a measured time interval, depending on the capacity of the capacitor (e.g. about 5 RC time constants), for all intents and purposes, the capacitor becomes fully charged. Following an isolation step (discussed below), a switching device (e.g. relay, triac, transistor, or the like) is used to quickly discharge the capacitor into the switch (e.g. a latching solenoid or latching relay). Thereafter, the capacitor remains discharged waiting for the next operation. Leaving the capacitor uncharged for long periods of time effectively eliminates capacitive leakage current.

The present invention avoids another source of energy waste found in typical battery operation. With existing controllers, when the capacitor discharges, the charging resistor is still connected from the high voltage battery source to the remote switch. This results in a further draw of current from the battery directly by the switch, which also depletes the battery. In the present design, the charging circuit is disabled and isolated by the charging transistor just prior to the capacitive discharge, thereby eliminating this unnecessary power drain. The circuit remains isolated for another measured interval (e.g. approximately 5 RC time constants, a few seconds) before the next operation, at which point the high voltage battery source is again connected to the capacitor for charging followed again by isolation immediately before discharge.

Lithium batteries are recommended as the power source for both the low and high voltage circuits. Lithium batteries have extremely long shelf life (10 years), extremely low self discharge (less than 1% per year), and are rated for full performance over a wide temperature range up to 85 degrees Centigrade. Most other types of batteries would self discharge under typical ambient conditions within a year. Also, lithium batteries have double the energy capacity of alkaline batteries, and are lighter in weight.

The microprocessor is capable of maintaining a set of programming instructions for one or more switches (e.g. valve solenoids) under its control, including at least one default program. The present invention provides a novel approach to changing the programming or initiating a default program which allows the controller to remain insulated from the exterior environment in order to preserve the controller circuitry and maximize the life of the batteries of the controller.

There are many possible remote locations for controllers of the present invention. In order to avoid damage from climatic elements or from vandalism, such controllers are typically located inside closable receptacles that may be locked for added protection. Such a receptacle may be attached to a wall, placed behind a door, located under a surface, or otherwise conveniently mounted in the vicinity of the switches to be controlled.

In one aspect of the invention for use in irrigation systems, the controller of the present invention may be placed in a closable box that is buried in the ground with its upper surface flush with the surface of the ground around it. The upper surface of such a box is usually a hinged or removable lid which allows access to the interior. The lid may be locked to the box in order to prevent unauthorized access.

A small radio receiver is included in the internal circuitry of the controller of the present invention. However, instead of remaining in a constantly operational condition, the power supply to this receiver is controlled by a magnetic switch which must be activated in order for the receiver to turn "on." Unless the magnetic switch is closed, the receiver is dormant and does not draw any power. The magnetic switch is located at an edge of the controller circuitry, and the circuitry mounted preferably near a wall, lid or door of the locked receptacle in which the controller is located. Where the controller cannot be mounted directly to a wall, lid or door of the receptacle, one aspect of the invention includes a conductive metallic member that may be provided between the magnetic switch and the edge of the receptacle to provide conductivity over this short gap. This member may take a variety of forms so long as it is made of a suitable conductive metal such as a rod, screw, nail, strip, laminate or other ferrous material. One end of the member is attached in the vicinity of the magnetic switch, and the other end is attached to a nearby wall, lid or door of the locked receptacle. A screw may be used for this purpose by drilling flush it into the wall, lid or door in the very near proximity of the magnetic switch. Such a screw must be made of conductive material, and be of sufficient length to extend from the wall, lid or door to very close proximity with the magnetic switch in order to have a conductive relationship with the switch. In this way, a magnet that is brought near the magnetic switch or the conductive member will cause the magnetic switch to close, thereby activating the radio receiver without opening the receptacle.

In one aspect of the invention, a transmitter may also be provided in the controller circuitry. Power to the transmitter is also controlled by the magnetic switch such that the transmitter is inactive unless the magnetic switch is closed. The transmitter is used to confirm the current programming of the controller, or to confirm receipt of new programming.

In one aspect of the invention, all of the circuitry of the present invention including the batteries, transmitter/receiver, and the magnetic switch are potted (encapsulated) so as to prevent impurities from corroding any of the component parts. This makes the batteries inaccessible. However, because the of the power conserving features of the present invention, the batteries have a very, very long life (on the order of 10 years) such that at the end of that time, the controller unit is simply removed and replaced.

A separate hand held programming unit is also provided for transmitting a program to the controller. This hand held unit includes a data input mechanism (e.g. push buttons, clock, switches, etc.), a display (LCD, LED, lights, or the like) and circuitry to receive, maintain and download the inputted data. The hand held unit is designed to hold numerous different sets of input (i.e., programs containing on/off switching instructions to be downloaded to the controller). The hand held unit also includes transmitter and receiver circuitry, and its own power supply. Importantly, the hand held unit also includes a magnet that is strong enough to trip the magnetic switch on the controller from the outside of the controller receptacle either directly or through the conductive member. The magnet is preferably integrated into the hand held unit, but may be provided separately.

In a typical use, the batteries, circuitry and magnetic switch of the controller are encapsulated (potted), and the encapsulated unit is mounted on or near a wall, lid or door of an environmentally protective receptacle which may be locked. If necessary, a conductive member may be attached to the encapsulated unit near the magnetic switch and extended a short distance to the wall, lid or door of the receptacle. The location of the magnet or conductive member should be marked on the outside of the receptacle.

The user inputs a set of programming instructions to the hand held unit. The user then travels to the controller location, and places the magnet of the hand held unit on the outside of the receptacle in the vicinity of the conductive member or magnetic switch of the controller. This activates the magnetic switch turning on the receiver and, if provided, the transmitter of the controller. The user then causes the hand held unit to download the programming instructions through its transmitter. These instructions are received by the controller in a matter of seconds. If a transmitter is provided on the controller, the hand held unit can then interrogate the controller to confirm the new programming. Once confirmed, the hand held unit is removed from the receptacle and the controller receiver/transmitter shuts off. In this way, not only is very little power required to program the controller, it is also unnecessary to make physical contact with the controller thereby avoiding the introduction of harmful foreign or corrosive materials from the environment. These aspects greatly extend the life of the battery operated controller while also allowing easy changes to be made to the controller programming. In addition by requiring magnetic activation external interference is avoided.

In another aspect of the invention, at least one default program is provided in the controller. For illustrative purposes and by way of example only, and without limiting the scope of the appended claims herein, such a program could provide for serial operation of each switch for a pre-determined time interval (e.g., one minute each in order to "manually" test each valve), and/or such a program could be a custom set of pre-determined switching operations designed as the default set of instructions for the given installation.

When the magnet of the hand held unit activates the magnetic switch of the controller, after a pre-determined time delay (e.g. 15 seconds, 30 seconds, 45 seconds, 60 seconds, etc.) the default programing initiated. The delay allows the user time to download programming from the hand held unit, interrogate the controller (if applicable), and remove the magnet thereby deactivating the magnetic switch before the default program starts. The default program only operates as long as the magnetic switch is activated. Thus, if the default program is a serial test of each switch or valve control, if a failure is detected (e.g. a leaking pipe) removal of the magnet from the switch will end the default program and close the switch (e.g. cutting off flow to the leaking pipe).

In a very simple aspect of the invention, the controller has only custom programming and a default program. The custom programming operates according to the specific needs of the installation, and cannot be changed. Accordingly, no hand held unit, radio transmitters or radio receivers are required. The default program is activated by using a magnet to close the magnetic switch. Removal of the magnet ends the default program and returns the unit to its custom programming.

It is therefore a primary object of the present invention to provide an improved battery powered programmable remote switch controller having numerous features which extend the life of the controller batteries.

It is also a primary object of the present invention to provide a battery powered programmable remote switch controller which includes a magnetic switch for activation of an on-board receiver, and a hand held unit with magnet and transmitter for downloading programming to the controller.

It is a further object of the present invention to provide a battery powered programmable remote switch controller which includes a magnetic switch and a default program, the default program being activated by operation of the magnetic after a time delay.

It is a further important object of the present invention to extend the life of the batteries in a battery powered programmable remote switch controller by not maintaining its activation capacitors in a fully charged condition at all times.

It is a further important object of the present invention to extend the life of the batteries in a battery powered programmable remote switch controller with circuitry which does not allow each capacitor to be charged until just before it is known to be needed for discharge to activate a switch.

It is a further important object of the present invention to extend the life of the batteries in a battery powered programmable remote switch controller using a load isolation circuit which engages to separate the high voltage batteries from the capacitors immediately prior to discharge of the capacitors.

It is a further important object of the present invention to extend the life of the batteries in a battery powered programmable remote switch controller using a circuit which isolates the capacitor(s) from the high voltage batteries several milliseconds before capacitor discharge, so as not to also draw on the capacitor-charging batteries during the discharge operation.

It is a further object of the present invention to extend the life of the batteries in a battery powered programmable remote switch controller in which the circuitry does not perform continuous power consuming input sampling, but instead either samples only once a second for several milliseconds, or reads the input at the beginning of a programmed operation.

It is a further object of the present invention to extend the life of the batteries in a battery powered radio programmable remote switch controller which includes a receiver by providing a magnetic switch to turn the receiver on and off, such that the receiver is dormant except when the magnetic switch is occasionally activated.

It is a further object of the present invention to minimize spurious, false and/or interfering radio frequency (RF) signals in a battery powered radio programmable remote switch controller by providing a receiver in the controller that is only occasionally activated using a magnetic switch.

It is a further object of the present invention to allow a battery powered radio programmable remote switch controller to be locked inside a receptacle where it is protected from the outside environment and from vandalism by providing a receiver in the controller that may be activated from the exterior of the receptacle using a magnetic switch.

It is a further object of the present invention to allow a battery powered radio programmable remote switch controller to receive programing while locked inside a protective housing by providing a receiver in the controller that may be activated from the exterior of the housing using a magnetic switch, and by providing a hand held unit with magnet and transmitter for, respectively, switching on the receiver and downloading programming.

It is a further object of the present invention to provide speedy radio programming of a battery powered remote switch controller.

It is a further object of the present invention to minimize the possibility of accidental improper programming of adjacent battery powered radio programmable remote switch controllers by providing a separate magnetic switch on each controller for individual activation of the receiver of each controller.

It is a further object of the present invention to provide a battery powered programmable remote switch controller in which the circuitry is encapsulated (potted or otherwise sealed) so as to prevent impurities from corroding any of the component parts, and to minimize exposure to electrostatic discharge.

It is a further object of the present invention to provide a battery powered programmable remote switch controller which uses lithium batteries for both the high and low voltage batteries because of their greater reliability and long life.

It is a further object of the present invention to provide a battery powered programmable remote switch controller which is adaptable for use for controlling irrigation valves.

It is a further object of the present invention to provide a battery powered programmable remote switch controller which is adaptable for use for controlling industrial, commercial, or utility switches or controls.

Other objects of the invention will be apparent from the detailed descriptions and the claims herein.

DETAILED DESCRIPTION OF THE DRAWINGS

Figure 1:
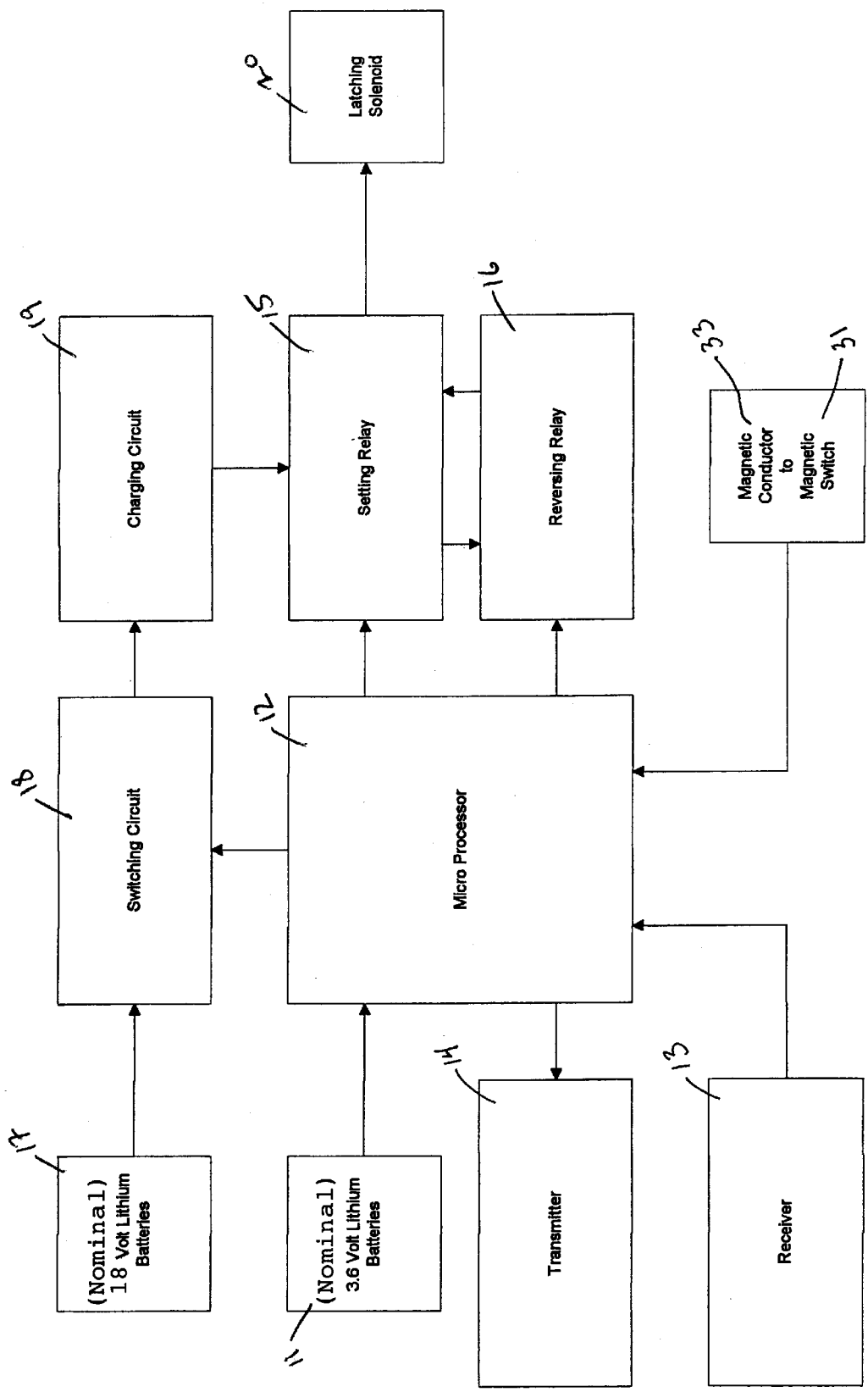
FIG. 1 is block diagram showing the general configuration of the battery powered controller of the present invention.
Figure 2:
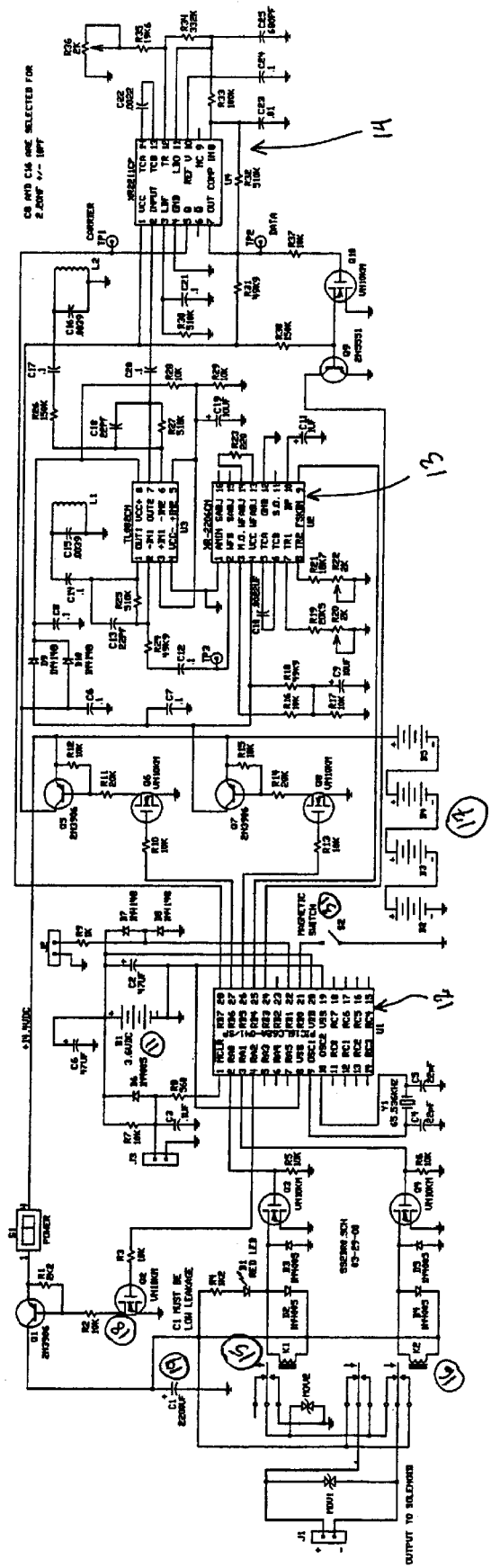
FIG. 2 is a circuit diagram of the battery powered controller of the present invention including receiver and transmitter circuitry.
Figure 3:
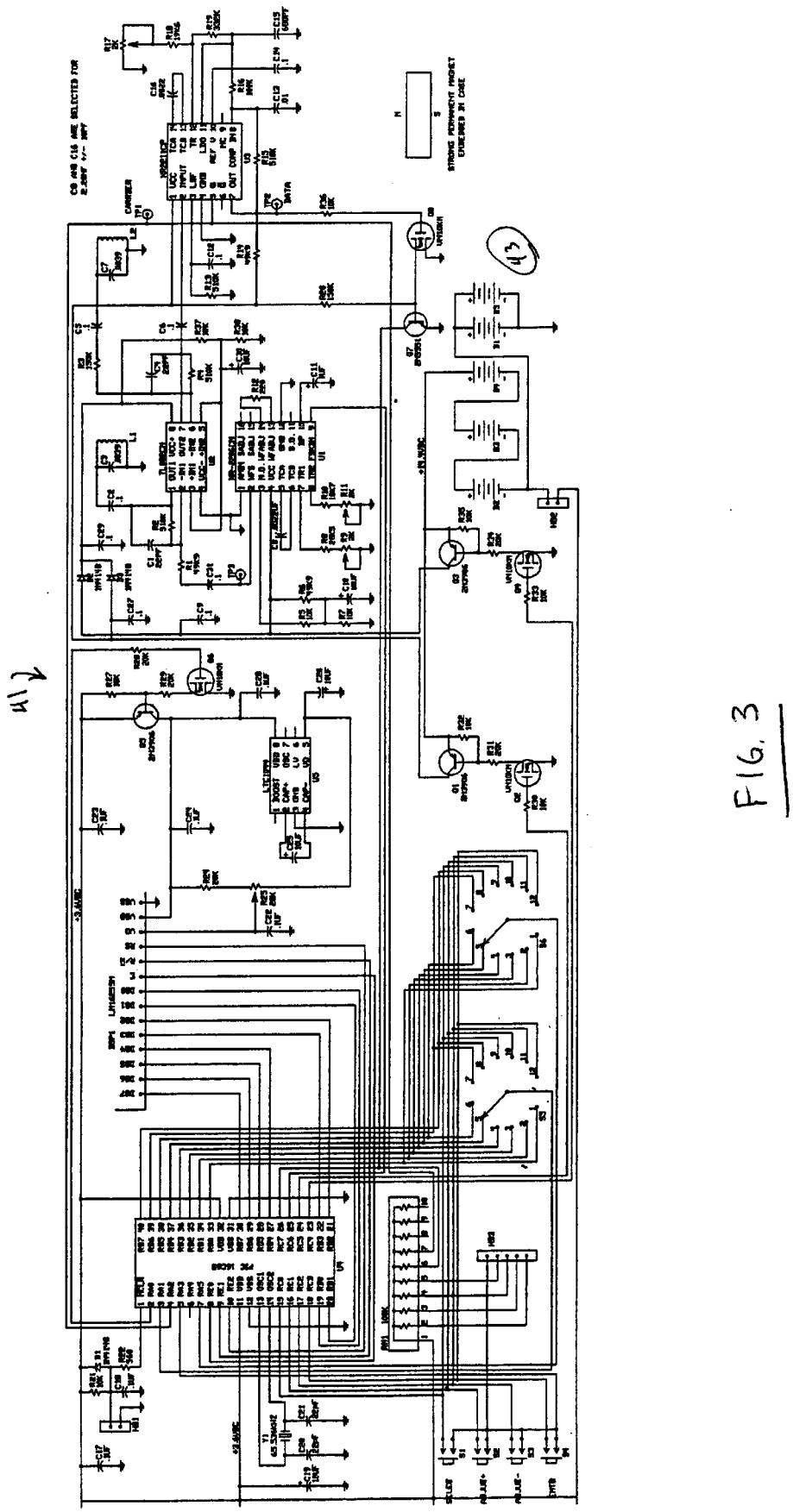
FIG. 3 is a circuit diagram of the battery powered hand held programming unit of the present invention.

Referring to the drawings wherein like reference characters designate like or corresponding parts throughout the several views, and referring particularly to FIGS. 1, 2 and 3, it is seen that the invention includes a microprocessor 12 powered by a source 11. Source 11 may be made up of at least one battery, preferably a lithium battery of approximately 3.6 volts. Although the following description refers to operation of a single capacitor and an irrigation valve solenoid, the invention may be easily adapted to operate multiple capacitors and multiple solenoids or multiple remote switches while maintaining the important power saving features described herein.

The microprocessor 12 receives programming from the receiver 13, as discussed below. Microprocessor 12 controls a first relay 15 (K1) which is used to send a setting or activation discharge from a large capacitor 19 (C1) in the controller to a remote switch 20 (e.g. a solenoid, to open an irrigation valve). It also controls a second relay 16 (K2) which is used to send a reverse or deactivation discharge from large capacitor 19 to the remote switch 20 (e.g. a solenoid to close a valve).

Microprocessor 12 also controls a switching circuit 18 (using transistors Q1 and Q2) between the high voltage battery source 17 (if an AC or DC power source is available, it can be used instead of battery source 17) and the large charging capacitors such as 19. The voltage of battery source 17 is preferably 14.4, but may be set at any suitable level. Two functions are performed by this circuit under control of the microprocessor. The first function is to delay the charging of capacitor 19 until a given interval just before it is to be discharged to the switch or solenoid 20. The second function is to isolate the charging battery source 17 from the recently-charged capacitor 19 immediately prior to discharge.

Input programming is provided to microprocessor 12 from receiver 13. This programming may include such things as identification of the switch(es) to be controlled (i.e. capacitors to be discharged), start and stop time(s), run time(s), selection between seconds, hours and/or minutes, automatic or semi-automatic operation, etc.

The microprocessor 12 reads the input from the receiver 13. This is only performed at the beginning of a programmed operation, or at infrequent intervals (e.g. once a second for approximately 20 milliseconds). During the remainder of the time, the microprocessor is dormant and only consuming a few microamps from low voltage battery source 11 in order to sustain the programming in RAM memory in the microprocessor. Meanwhile, capacitor 19 is left in an uncharged state. Reading the input tells the microprocessor what function is to be performed when, according to the most recent program settings from the receiver.

Figure 6:
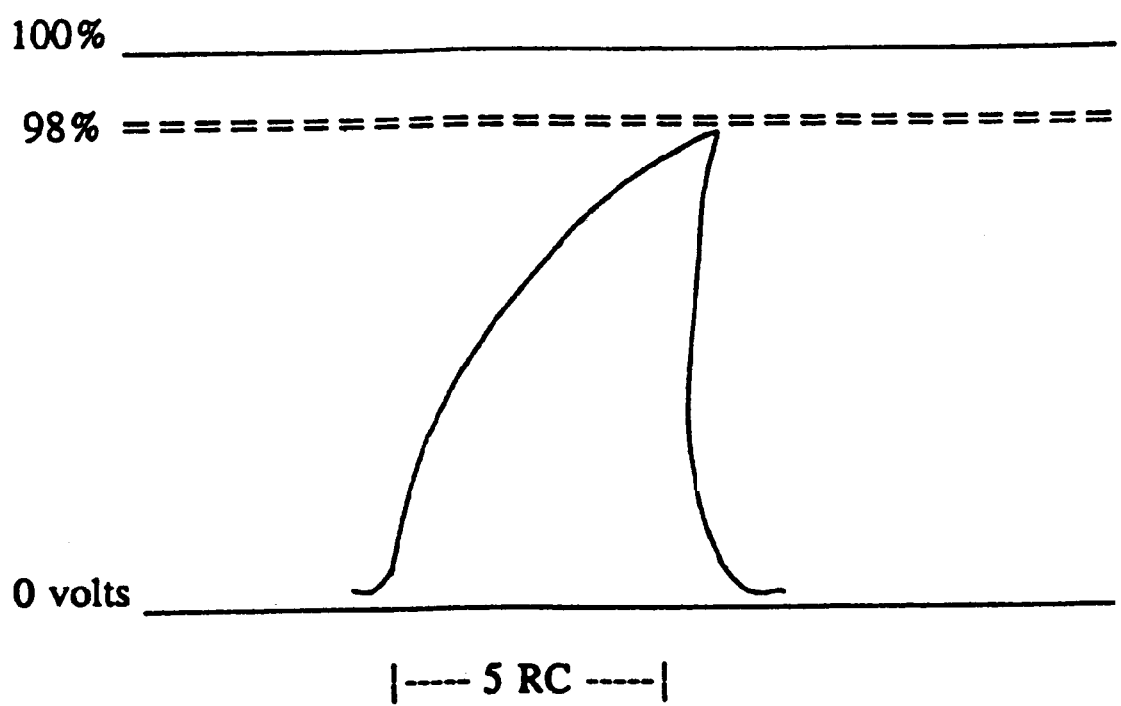
FIG. 6 is a chart showing the charge and discharge of a large capacitor of the present invention over time.

According to the programming or sampling and its internal clock, the microprocessor is able to detect that a switching operation (activation or deactivation) is upcoming. Approximately 5 seconds (5 RC) before such an operation is to occur, the microprocessor sends a signal (e.g. from pin 4 (see FIG. 2)) to transistor Q2 causing transistor switch Q1 to make the connection between the high voltage battery source 17 and capacitor 19. This causes capacitor 19 to become charged (see FIG. 6). Then, just a few milliseconds before the time for discharging capacitor 19, the microprocessor sends a second signal to turn off transistors Q1 and Q2 thereby isolating the high voltage battery source 17 from capacitor 19. Almost immediately thereafter, capacitor 19 is discharged to the remote switch (e.g. solenoid 20). Capacitor 19 remains in a discharged state until just before the next time a solenoid operation occurs. At that time, the above process is repeated for that solenoid operation, etc.

Microprocessor 12 also controls whether the charge sent to the switch/solenoid is an activation pulse (to open the solenoid) or deactivation pulse (to close the solenoid) by using relay 15 (K1) and double pole reversing relay 16 (K2). Solid state switching mechanisms could be used in place of relays K1 and K2. A signal from the microprocessor (e.g. pin 2 as shown in FIG. 2) to transistor Q3 operates relay K1 causing a direct charge to be sent via relay K1 to the remote switch (e.g. to open the solenoid 20). Signals from the microprocessor (e.g. pins 2 and 3 as shown in FIG. 2) to transistors Q3 and Q4 operate both relays K1 and K2, causing a reverse charge to be sent via relay K1 and double pole reversing relay K2 to the remote switch (e.g. to close the solenoid 20).

Multiple remote switches (e.g. solenoids 20) can be operated by the same controller by providing duplicate sets of circuitry, each set operating a different remote switch 20 using its own capacitor 19, transistors Q1–Q4, and relays K1 and K2. When multiple capacitors 19 are provided, each may have a different capacitance depending upon the level of discharge desired for the remote switch/solenoid associated with the given capacitor. Each duplicate circuit will require its own initiating pin on the microprocessor 12 (e.g. pin 4), and a pair of additional pins (e.g. pins 2 and 3) to control the polarity of the discharge. For controlling large numbers of switches/solenoids, a larger microprocessor or multiple microprocessors may be employed in the controller.

A receiver circuit 13 is provided in the controller for receiving data input to be used by the controller. Power to the receiver is supplied from source 17 which is controlled by a magnetic reed switch 31. When a magnet or magnetic field is brought into conductive relationship with switch 31, it closes thereby supplying power to the receiver circuit. Otherwise (which is most of the time), the receiver circuit is dormant and does not drain power, thereby providing a significant savings in power and prolonging the life of the batteries. This also prevents the reception of misdirected radio signals which might otherwise confuse the programming to the controller.

In one aspect of the invention, a transmitter circuit 14 may also be provided in the controller. Power to transmitter 14 is also controlled by magnetic switch 31 so that it is dormant most of the time, and only "wakes up" when the receiver does.

A separate hand held programming unit 41 is also provided for radio downloading of programming to the controller. This unit includes its own power supply 43, transmitter circuitry 45, and receiver circuitry 47. Data input devices 49 are provided on unit 41 and may be in the form of push buttons, switches, a rotatable dial (clock), or any combination of these or other suitable devices for providing programming to the unit. A data/programming display is also provided on unit 41 in the form of LCD, LED, lights, or the like. Unit 41 is capable of holding multiple programs. In this way, the user can input several different programs into the unit in advance, and then select the desired program to be downloaded in the field.

Figure 5:
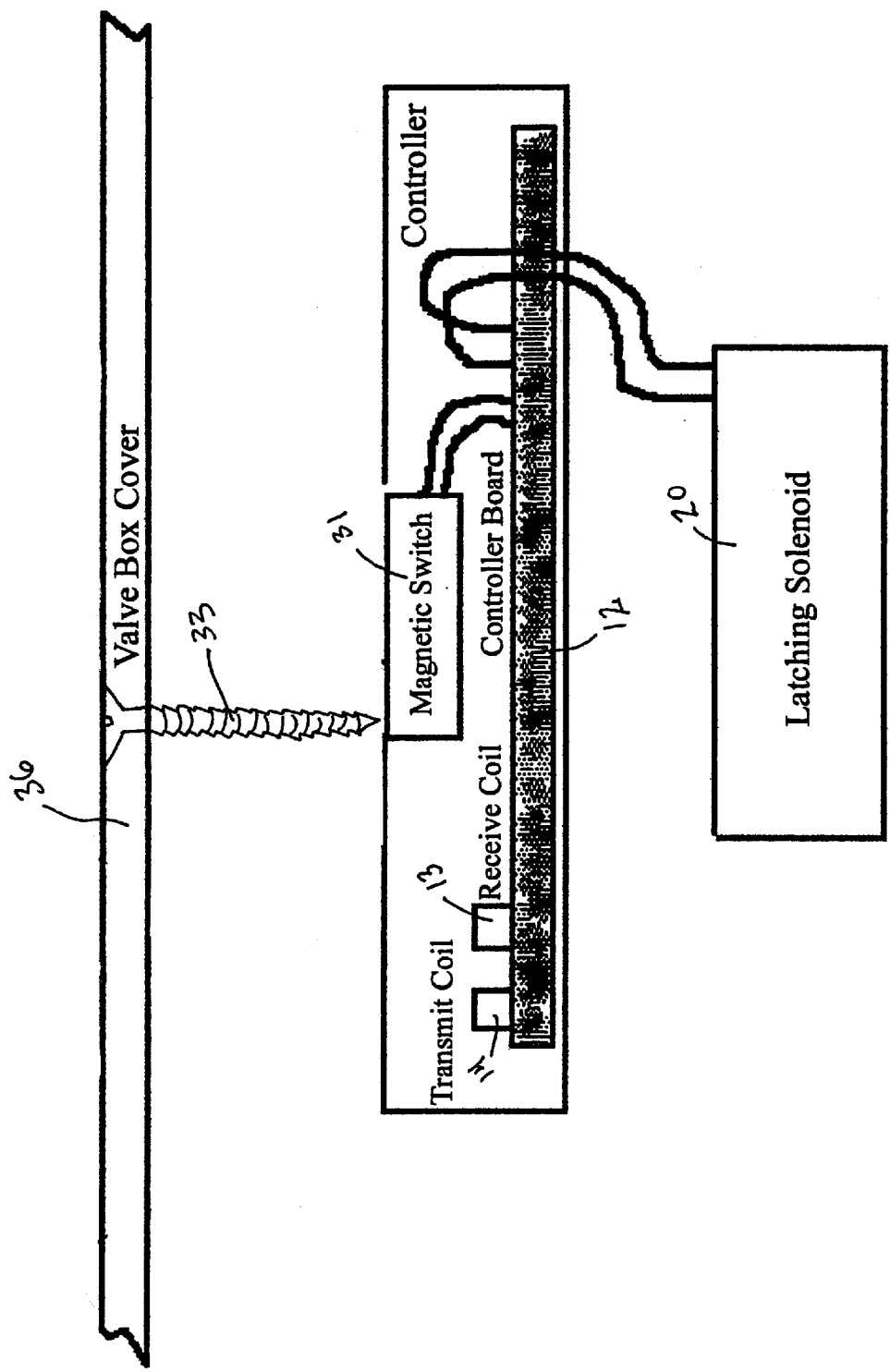
FIG. 5 is a cross sectional side view of an example environment for the controller of the present invention illustrating an alternative embodiment of the conductive member.

Importantly, a magnet 44 is provided with programming unit 41. Magnet 44 is used to activate (close) magnetic switch 31 either directly by being brought into conductive relationship with switch 31, or indirectly by being brought into conductive relationship with member 33 that is associated with switch 31. In one aspect of the invention shown in FIG. 5, member 33 is a conductive screw that is drilled through the lid of the enclosure such that the screw head is flush with the lid, and the body of the screw is in close proximity (conductive relationship) with switch 31. By activating switch 31, the receiver (and transmitter) of the controller are activated so that radio downloading of programming may be accomplished. Assuming that the programming has been previously input into unit 41, the desired program is simply selected and downloaded taking only a few seconds. If the transmitter circuit is provided on the controller, unit 41 may interrogate the controller and learn in another few seconds whether the download was successful. Since the download and interrogation steps can be accomplished in a matter of seconds, the drain on the controller batteries is equally brief, thereby greatly prolonging the life of the controller batteries.

Figure 4:
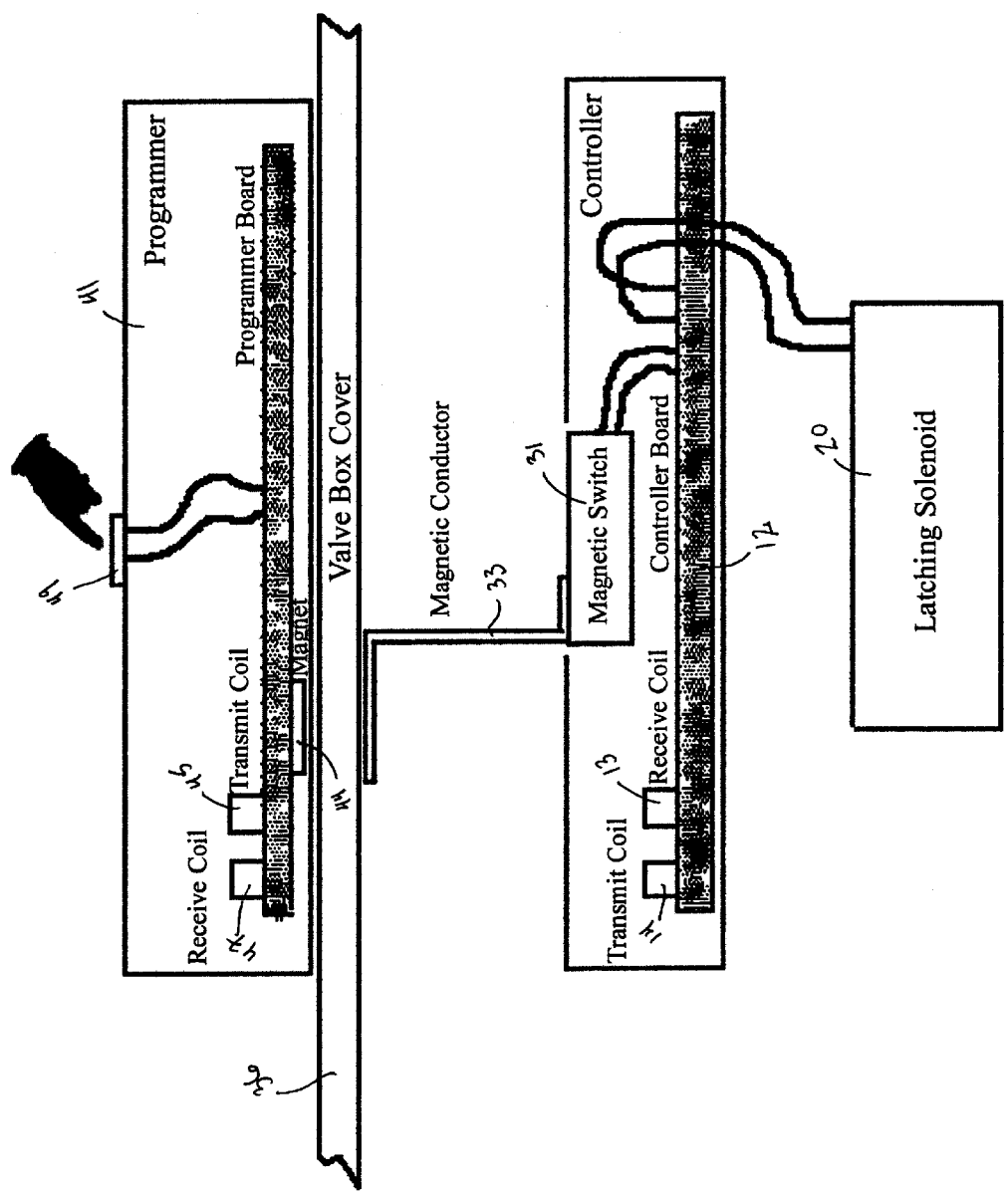
FIG. 4 is a cross sectional schematic side view of an example environment for a controller of the present invention adapted for controlling irrigation valves. This figure also illustrates the hand held unit with a magnet that has been placed in conductive relationship with the magnetic switch of the controller.

Magnet 44 is preferably integrated into the housing of unit 41 (as shown in FIG. 4), but may be provided separately if so desired. If the magnet is separate, unit 41 must be brought into close proximity with the controller for radio programming to be received. If the magnet is attached to unit 41, bringing the magnet close enough to trip the magnetic switch also brings unit 41 close enough for radio programming to be easily received.

In an alternative embodiment, at least one default program is provided in the controller. When magnet 44 closes magnetic switch 31, there is a time delay during which programming may be downloaded to the controller and verified as described previously. After the time delay, if no programming has been downloaded, the controller automatically initiates the default program. The default program operates only while the magnetic switch 31 is activated; thus, removal of magnet 44 will stop the default program.

In a variation of this alternative embodiment, the hand held unit is eliminated, and no radio receiver or transmitter is provided in the controller. Instead, the controller has unchangeable custom programming and a default program. The custom programming operates unless a magnet 44 trips the magnetic switch 31. When this occurs, the default program is initiated and operates so long as the magnetic switch 31 is activated. Upon removal of the magnet 44, the custom programming resumes.

DESCRIPTION OF THE PREFERRED EMBODIMENTS

In the preferred embodiment, power to the printed circuit board and/or microprocessor 20 is provided using one or more nominally 3.6 volt battery(ies) 11. Battery 11 may be of any suitable size such as AA, AAA or smaller, preferably lithium based. Lower voltage batteries may be provided for microprocessors 20 requiring less power. Power to capacitors 19 is provided from a separate source 17 which may be one or more battery(ies) providing nominally 18 volts during the capacitor charging operation. Each capacitor 19 (C1 in FIG. 2) should have a capacity of between approximately 1000 and 2500 micro farads ($\mu F$) at 25 volts, preferably 2200 $\mu F$ at 25 volts.

The preferred delay time before each capacitor is allowed to be charged is approximately 5 seconds, although a longer time interval may be employed (e.g. 10 seconds) so long as it is reasonably close to the time for discharge so that leakage is minimized. The 5 time constant interval generally allows the 2200 $\mu F$ capacitor 19 to reach a 98% charge from the power supply 17 before it is discharged, thereby avoiding any leakage.

The capacitor-charging battery source 17 should be isolated from the capacitors at some time prior to discharge of the capacitors. Although this isolation may be performed at any time before discharge, the preferred time interval is approximately 31 milliseconds.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

In particular, it should be noted that although the diagram of FIG. 2 shows circuitry for operation of a single capacitor and remote switch, this circuitry can be easily adapted for use in controlling multiple capacitors and switches while maintaining the same power saving features of the invention (maintaining capacitor in discharged condition until just seconds prior to discharge, isolation of capacitor from power source immediately prior to discharge, quiescent microprocessor, etc.).

What is claimed is:

1. A programmable control for operating a magnetically operable switch and at least one remote switch comprising:
   a. a hand held programming unit having a data input mechanism, and a radio transmitter;
   b. a magnet associated with said hand held unit; and
   c. a battery powered controller electrically connected to a radio receiver, said controller having circuitry therein for controlling the at least one remote switch, and the magnetically operable switch electrically connected to said radio receiver, said magnetically operable switch enabling said receiver when said magnet is brought into the conductive proximity of said magnetically operable switch.

2. The control of claim 1 wherein at least one default program is provided in said controller, said at least one default program being commenced following a time delay after activation of said magnetically operable switch.

3. The control of claim 1 wherein a radio receiver is provided in said hand held unit and a radio transmitter is provided in said controller, the receiver in said controller also being electrically connected to said controller and enabled when said magnet is brought into conductive proximity of said magnetically operable switch.

4. The control of claim 1 wherein the range of conductive activation of said magnetically operable switch is increased using a conductive metallic member that extends outward from said magnetically operable switch.

5. The control of claim 4 wherein said circuitry for controlling said at least one remote switch comprises:
   a. a first DC battery power source, at least one DC charge storage means, a first switchable connection between said first power source and said DC charge storage means, and a second switchable connection between said DC charge storage means and said at least one switch; and
   b. a second low voltage DC battery power source, and a microprocessor connected to said low voltage DC battery power source for controlling said first and second switchable connections such that said first connection defaults to an open condition, but upon the commencement of a programmed operation by said microprocessor, said first connection is closed for a measured interval in order to provide a charge to said DC charge storage means whereupon said first connection is again opened just before said second connection is closed causing said DC charge storage means to be discharged to said at least one remote switch.

6. The control of claim 4 wherein said controller is mounted inside a closable container, and said conductive member extends between said magnetically operable switch and the inside edge of one of the group consisting of a wall, a lid, and a door of said container.

7. The control of claim 6 wherein the walls, door and lid of said container are made of a material which will allow penetration by a magnetic field, and the magnetic field generated by the magnet associated with said hand held unit is strong enough to penetrate said walls, door and lid.

8. The control of claim 1 wherein said magnet is attached to said hand held unit.

9. The control of claim 6 wherein a lock is provided on said container.

10. The control of claim 1 wherein the circuitry of said controller is encapsulated.

11. The control of claim 1 wherein the data input mechanism of said hand held unit is selected from the group consisting of push buttons, switches and a rotatable dial.

12. The control of claim 1 wherein a data display is provided on said hand held unit.

13. The control of claim 1 wherein said hand held unit is capable of maintaining a plurality of distinct programs to be downloaded to said controller.

14. A method for controlling a remote switch using a magnetically operable switch comprising the steps of:
   a. electrically connecting said remote switch to a battery powered controller, said controller having a radio receiver, circuitry for controlling said remote switch, and a magnetically operable switch for controlling the power to said radio receiver;
   b. bringing a magnet associated with a hand-held unit into conductive proximity with said magnetically operable switch thereby activating said receiver; and
   c. transmitting programming information from said unit via radio to said receiver for use by said controller.

15. The method of claim 14 including the additional step of removing said magnet from conductive proximity with said magnetically operable switch thereby deactivating said receiver.

16. The method of claim 14 wherein at least one default program is provided in said controller, and including the additional step of commencing said default program following a time delay after activation of said magnetically operable switch.

17. The method of claim 14 wherein said magnetically operable switch controls the power to both said receiver and a radio transmitter in said controller, and wherein said hand-held unit includes a radio receiver, and including the additional step of interrogating said controller to confirm receipt of said programming information before removing said magnet.

* * * * *